(12) United States Patent
Kamigama et al.

(10) Patent No.: US 6,829,818 B2
(45) Date of Patent: Dec. 14, 2004

(54) MANUFACTURING METHOD OF A HEAD GIMBAL ASSEMBLY

(75) Inventors: Takehiro Kamigama, Tokyo (JP); Masashi Shiraishi, Tokyo (JP)

(73) Assignee: TDK Corporation, Tokyo (JP)

(*) Notice: Subject to any disclaimer, the term of this patent is extended or adjusted under 35 U.S.C. 154(b) by 287 days.

(21) Appl. No.: 09/949,844

(22) Filed: Sep. 12, 2001

(65) Prior Publication Data

US 2002/0029461 A1 Mar. 14, 2002

(30) Foreign Application Priority Data

Sep. 12, 2000 (JP) .................................... 2000-276566

(51) Int. Cl.$^7$ ......................... G11B 5/127; H04R 31/00
(52) U.S. Cl. ............................. 29/603.06; 29/402.01; 29/402.06; 29/402.08; 29/402.21; 29/603.02; 29/603.04; 29/603.07; 29/760; 29/770; 228/175; 228/180.22; 228/219; 360/121; 360/123; 360/126; 360/234.1; 360/234.5; 360/317
(58) Field of Search ....................... 29/426.1, 603.02, 29/603.04, 603.06, 603.07, 603.09, 76, 402.01, 402.06, 402.08, 402.21, 760, 770; 360/121, 123, 126, 234.1, 234.5, 234.6, 317; 228/175, 180.2, 219

(56) References Cited

U.S. PATENT DOCUMENTS

| | | | | |
|---|---|---|---|---|
| 4,568,011 A | * | 2/1986 | DeArmitt et al. | 228/20.5 |
| 4,659,004 A | * | 4/1987 | Fridman | 228/6.2 |
| 5,529,441 A | * | 6/1996 | Kosmowski et al. | 408/1 R |
| 5,896,247 A | * | 4/1999 | Pan et al. | 360/234.5 |
| 6,341,415 B2 | * | 1/2002 | Amemiya et al. | 29/603.06 |
| 6,351,353 B1 | * | 2/2002 | Sluzewski et al. | 360/294.3 |

FOREIGN PATENT DOCUMENTS

| | | | | |
|---|---|---|---|---|
| JP | 55073920 A | * | 6/1980 | ........... G11B/05/27 |
| JP | 63-113917 | | 5/1988 | |
| JP | 07-029942 | | 1/1995 | |
| JP | 07-297539 | | 11/1995 | |
| JP | 10-107095 | | 4/1998 | |

OTHER PUBLICATIONS

"Numerical simulation and animation of head–disk–assembly dynamics"; Cha, E.; Bogy, D.B.; Magnetics, IEEE Transactions on, vol: 27 Issue:6 , Nov. 1991; pp.: 5136–5138.*

* cited by examiner

Primary Examiner—Peter Vo
Assistant Examiner—Paul D Kim
(74) Attorney, Agent, or Firm—Burns, Doane, Swecker & Mathis, L.L.P.

(57) ABSTRACT

A magnetic head slider with at least one thin-film magnetic head element on a suspension is mounted. This mounting includes electrically connecting the magnetic head slider with the suspension with ball bonding connections. Electrical property of the thin-film magnetic head element is inspected, and then the ball bonding connections are separated when it is judged that the thin-film magnetic head element has defective electrical property. Then, the magnetic head slider is detached from the suspension, and thereafter a new magnetic head slider with at least one thin-film magnetic head element is mounted on the suspension from which the magnetic head slider was detached.

11 Claims, 5 Drawing Sheets

MANUFACTURING METHOD OF A HEAD GIMBAL ASSEMBLY

FIELD OF THE INVENTION

The present invention relates to a manufacturing method of a head gimbal assembly (HGA) provided with at least one thin-film magnetic head element used in for example a hard disk drive unit (HDD) and to an apparatus for cutting ball bonding connections, used during manufacturing the HGA.

DESCRIPTION OF THE RELATED ART

In an HDD, thin-film magnetic head elements for writing magnetic information into and/or reading magnetic information from magnetic disks are in general formed on magnetic head sliders flying in operation above the rotating magnetic disks, respectively.

Each HGA is assembled by mounting the magnetic head slider on a suspension and then by electrically connecting connection pads of lead conductors with terminal electrodes of the magnetic head slider, respectively.

After thus assembling the HGAs, all of the assembled HGAs are finally checked using a dynamic performance (DP) tester to judge whether each thin-film magnetic head element has a desired electrical property or not. Only HGAs judged in this final inspection as products with a good performance are permitted for a shipment or assembling into the HDD.

Recently, an HGA with a wireless suspension using no lead wire but having trace conductors for signal lines has widely spread. In such HGA with the wireless suspension, electrical connection between connection pads of the trace conductors and terminal electrodes of the magnetic head slider are mainly achieved by a wire bonding or a ball bonding.

In the conventional manufacturing process of an HGA with a wireless suspension, particularly of an HGA with a wireless suspension using ball bonding connections, the HGA judged as defective in the final inspection was discarded.

However, a wireless suspension itself is expensive in comparison with a normal suspension, and therefore a ratio of a manufacturing cost of the wireless suspension with respect to a total manufacturing cost of the HGA with the wireless suspension is quite high.

Thus, if all HGAs judged as poor electrical property in the final inspection are discarded, an average manufacturing cost of the HGA will extremely increase.

SUMMARY OF THE INVENTION

It is therefore an object of the present invention to provide a manufacturing method of HGA and an apparatus for cutting ball bonding connections, whereby a manufacturing cost of HGA can be decreased.

According to the present invention, a manufacturing method of an HGA includes a step of mounting a magnetic head slider with at least one thin-film magnetic head element on a suspension, this mounting step including electrically connecting the magnetic head slider with the suspension with ball bonding connections, a step of inspecting electrical property of the thin-film magnetic head element, a step of separating the ball bonding connections when it is judged that the thin-film magnetic head element has defective electrical property, a step of detaching the magnetic head slider from the suspension, and a step of mounting a new magnetic head slider with at least one thin-film magnetic head element on the suspension from which the defective magnetic head slider was detached.

When it is detected that the thin-film magnetic head element has defective electrical property, the ball bonding connections between the suspension and the magnetic head slider are separated without discarding the suspension, and then a new magnetic head slider is mounted on the suspension to recondition an HGA. Since the expensive suspension is reused in manufacturing of the HGA, a manufacturing cost of the HGA can be reduced. Also, since the suspensions are reused without discarding all of them in the defective HGAs, this method can contribute to environmental protection.

It is preferred that the ball bonding connections are gold ball bonding (GBB) connections using gold balls. In this case, the separating step may include cutting the gold balls by a cutter blade. Since the material of gold is soft, cutting of the gold balls using the sharp cutter blade is very easy to carry out.

It is also preferred that the cutting of the gold balls includes cutting the gold balls so that a thin gold layer remains on connection pads formed on the suspension. Since whole gold ball is not removed but the thin gold layer is remained on the connection pads, deformation of the suspension due to the cutting of the ball bonding connections can be almost prevented from occurring. Furthermore, since the thin gold layer is remained on the connection pads of the suspension, GBB of electrode terminals of a new magnetic head slider with the connection pads when remounting the slider on the suspension can become easy and a strength of the re-bonded section will increase.

It is preferred that the ball bonding connections are solder ball bonding (SBB) connections using solder balls. In this case, the separating step may include heating and melting the solder balls. It is also preferred that the separating step further includes removing the molten solder ball by vacuum suction.

It is preferred that the detaching step includes heating a part of the magnetic head slider and a part of the suspension to loosen adhesive used to mechanically fix the magnetic head slider to the suspension.

It is also preferred that the method further includes a step of cleaning an adhesion surface of the suspension after the detaching step.

It is further preferred that the method further includes a step of checking performance of the suspension after the detaching step. In this case, the checking step may include checking a load and an attitude angle of the suspension.

It is preferred that the method further includes a step of inspecting electrical property of the thin-film magnetic head element of the new magnetic head slider after the new magnetic head mounting step.

According to the present invention, also, a manufacturing method of an HGA includes a step of mounting a magnetic head slider with at least one thin-film magnetic head element on a suspension, a step of inspecting electrical property of the thin-film magnetic head element, a step of detaching the magnetic head slider from the suspension when it is judged that the thin-film magnetic head element has defective electrical property, a step of cleaning an adhesion surface of the suspension, and a step of mounting a new magnetic head slider with at least one thin-film magnetic head element on the suspension from which the defective magnetic head slider was detached.

Furthermore, according to the present invention, an apparatus for cutting ball bonding connections includes an attachment member for attaching an HGA that includes a suspension with connection pads and a magnetic head slider with at least one thin-film magnetic head element, the magnetic head slider being mounted on the suspension and electrically connected to the connection pads by GBB using gold balls, and a cutter blade capable of moving in parallel with a surface of the connection pads of the suspension attached to the attachment member, the gold balls being mechanically cut and separated by the moving of the cutter blade. Since the material of gold is soft, cutting of the gold balls using a sharp cutter blade is very easy to carry out.

It is preferred that the cutter blade cuts the gold balls so that a thin gold layer remains on the connection pads of the suspension. Since whole gold ball is not removed but the thin gold layer is remained on the connection pads, deformation of the suspension due to the cutting of the ball bonding connections can be almost prevented from occurring. Furthermore, since the thin gold layer is remained on the connection pads of the suspension, GBB of electrode terminals of a new magnetic head slider with the connection pads when remounting the slider on the suspension can become easy and a strength of the re-bonded section will increase.

It is also preferred that the apparatus further includes a blower member for blowing hot air or hot nitrogen gas to the magnetic head slider.

Further objects and advantages of the present invention will be apparent from the following description of the preferred embodiments of the invention as illustrated in the accompanying drawings.

DESCRIPTION OF THE PREFERRED EMBODIMENTS

Figure 1:
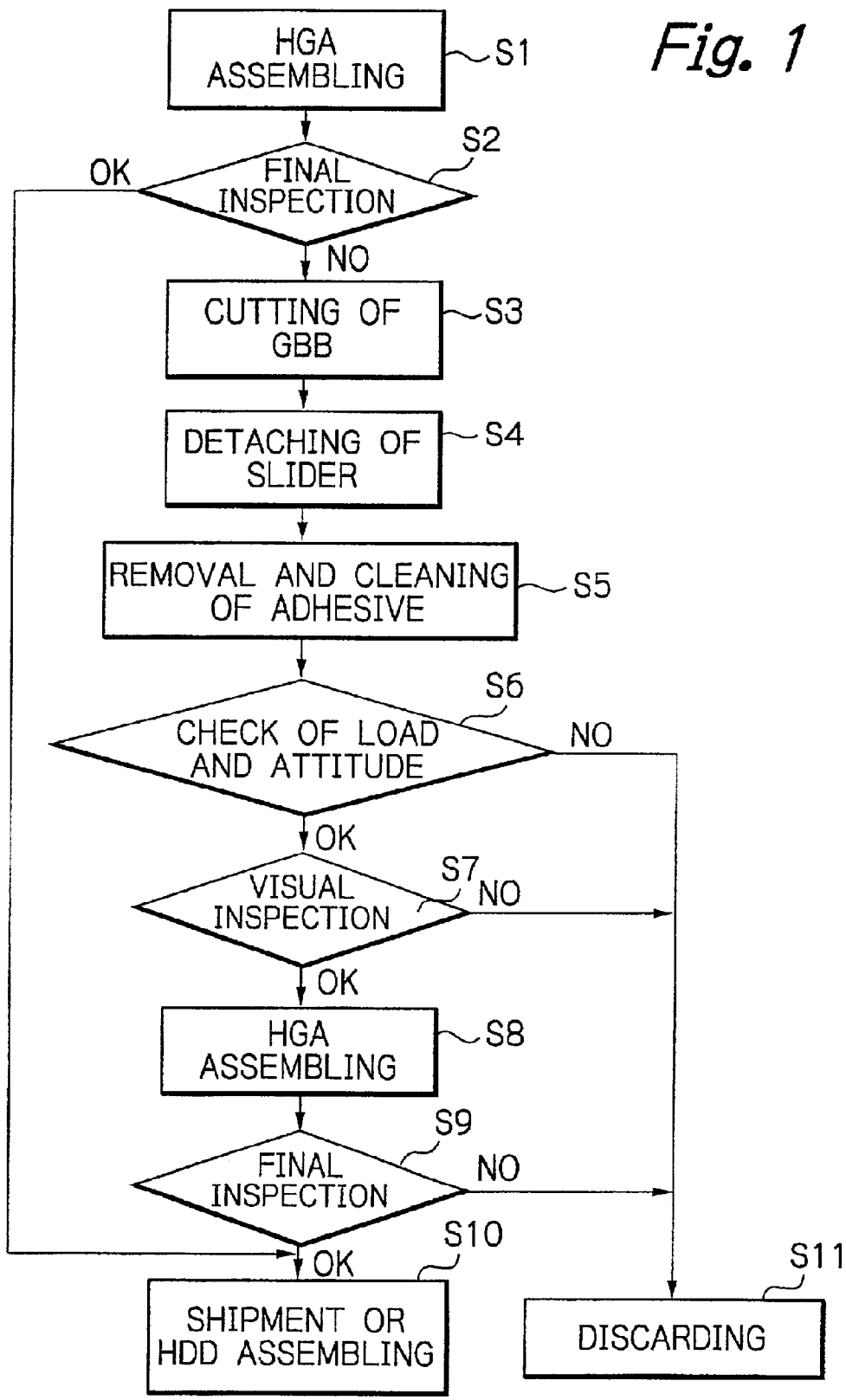
FIG. 1 shows a flow chart illustrating a part of manufacturing process of an HGA in a preferred embodiment according to the present invention.

Referring to FIG. 1, a manufacturing process of an HGA in a preferred embodiment according to the present invention will be described.

First, an HGA is assembled in accordance with a normal fabrication process (step S1). Namely, the HGA is assembled by fixing a magnetic head slider with a thin-film magnetic head element to a top end section of a wireless suspension using an adhesive such as an epoxy resin adhesive, and then by electrically connecting terminal electrodes of the slider with connection pads of a lead conductor pattern of the suspension by GBB. An IC chip with a head drive circuit and a read-out signal amplifier circuit may be mounted on the lead conductor pattern extending backward from the suspension.

Then, a final inspection using a DP tester, for checking whether the thin-film magnetic head element has a desired electrical property or not is executed (step S2). HGAs judged in this final inspection as products with a good performance are permitted for a shipment or assembling into an HDD (step S10).

Figure 2:
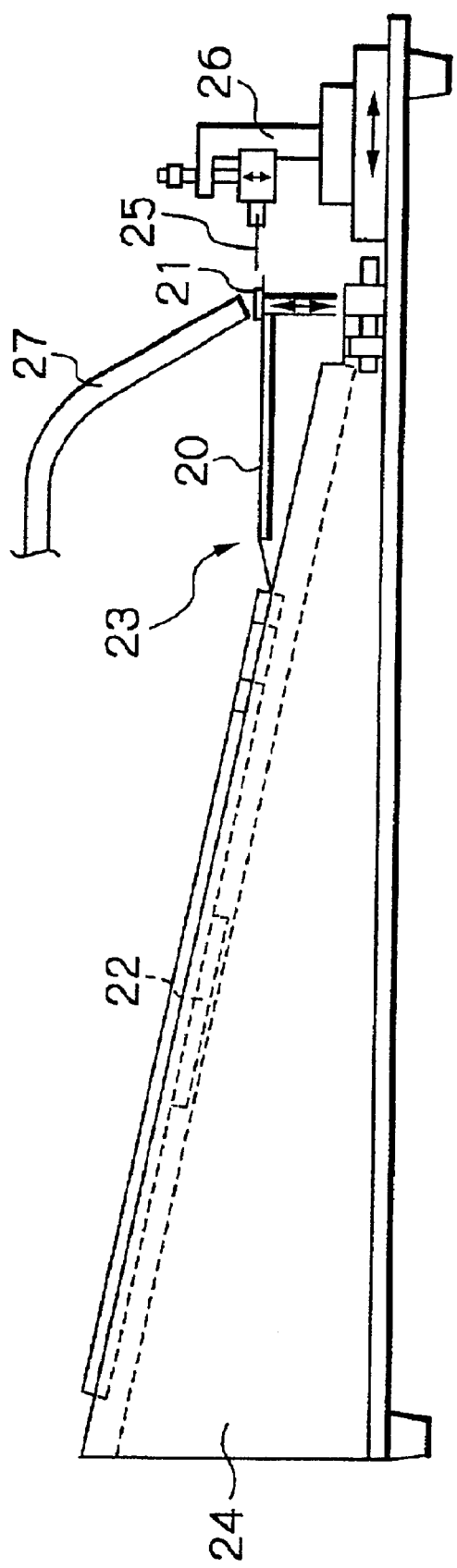
FIG. 2 shows a schematic configuration of a bonding connection cutting apparatus used in the embodiment shown in FIG. 1.

In the final inspection at step S2, if it is judged that the electrical property of the thin-film magnetic head element is defective, the HGA is attached to a bonding connection cutting apparatus shown in FIG. 2, and then GBB connections of the HGA are mechanically cut by pushing a sharp cutter blade to the gold balls (step S3). Then, the adhesive is loosened to some extent by heating and the slider is detached from the suspension (step S4). The detached slider will be discarded. Thereafter, the remaining adhesive is removed and an adhesion surface of the suspension to which the slider had been adhered is cleaned (step S5).

Hereinafter, the above-mentioned processes from the cutting process to the cleaning process will be described in detail.

The bonding connection cutting apparatus shown in FIG. 2 is used for cutting the GBB connections and for detaching the slider from the suspension. This apparatus mainly includes an attachment member 24 for securing the HGA 23 consisting of a suspension 20, a magnetic head slider 21 adhered at a top end section of the suspension 20 and an IC chip 22 mounted on a lead conductor pattern extending backward from the suspension 20, a cutting member 26 capable of precisely moving a sharp cutter blade 25 along a vertical direction and a horizontal direction in the figure, and a hot air gun 27 for blowing hot air or hot nitrogen gas.

The attachment member 24 secures a base plate of the suspension 20 so that the top end section of the suspension 20 at which the magnetic head slider 21 is fixed can be precisely moved in the vertical direction and kept in a horizontal location.

The cutting member 26 cuts the GBB connections by precisely moving the cutter blade 25 in parallel with the surface of the connection pads formed on the fixed suspension 20.

Although it is not shown, this bonding connection cutting apparatus may have a camera for magnifying and supervising the GBB connections to be cut.

FIGS. 3a to 3f illustrate processes from the cutting of the GBB connections (step S3) to the cleaning of the suspension surface (step S5).

Figure 3A:
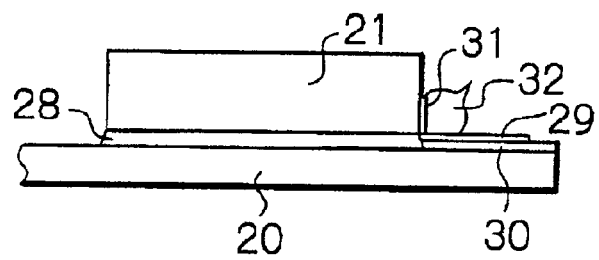
FIGS. 3a to 3f illustrate processes from a cutting of GBB connections to a cleaning of suspension surface in the embodiment shown in FIG. 1.

In FIG. 3a which illustrates the magnetic head slider and a part of the suspension before cutting, reference numeral 28 denotes a resin adhesive for adhering the magnetic head slider 21 to the suspension 20, 29 the connection pad formed as a part of the lead conductor pattern 30 laminated on the suspension 20, 31 the terminal electrode of the magnetic head slider 21, and 32 the gold ball used for electrically connecting the terminal electrode 31 with the connection pad 29, respectively. The resin adhesive 28 may be for example a thermosetting resin adhesive with a glass transition point of 150° C. such as an epoxy resin adhesive or an acryl UV resin adhesive.

Figure 3B:
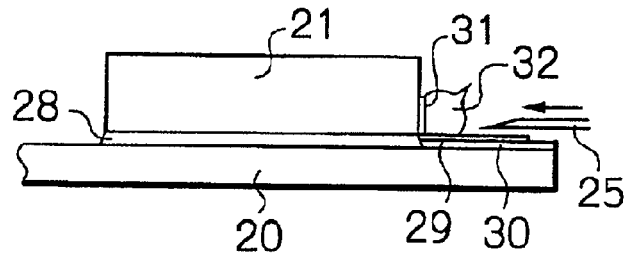

As shown in FIG. 3b, the sharp cutter blade 25 is moved in parallel with the surface of the connection pad 29 and pushed to cut and separate the gold ball 32.

Figure 3C:
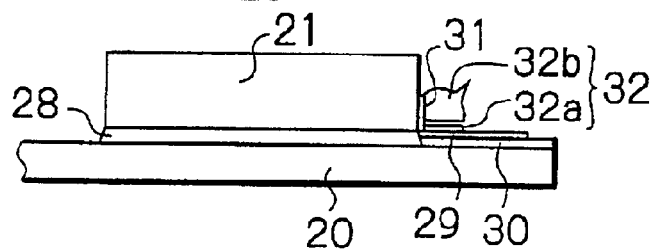

FIG. 3c shows the state after the cutting. The gold ball 32 is cut to separate into a thin gold layer 32a on the connection pad 29 and a remaining part 32b. It is desired that the thin gold layer 32a is as thin as possible. For example, a thickness of the thin gold layer 32a may be 5 µm or less.

Figure 3D:
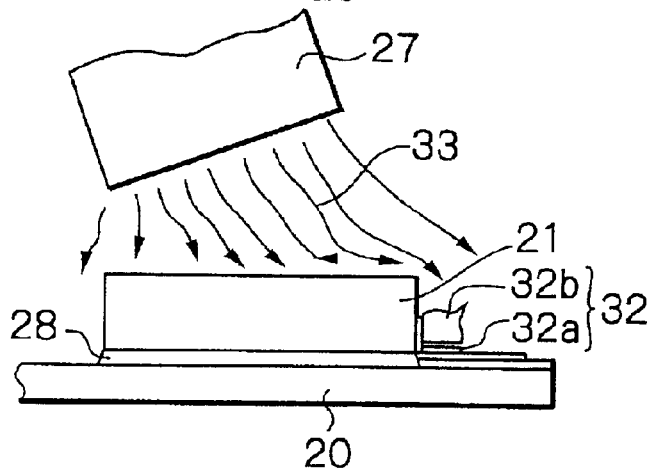
Figure 3E:
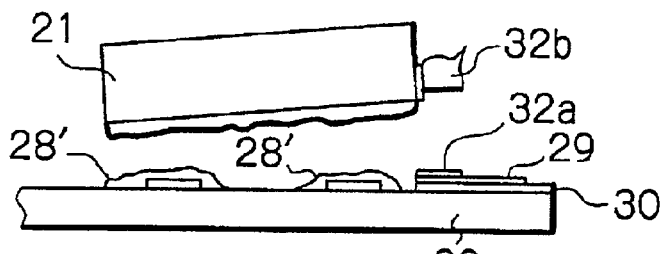

Then, as shown in FIG. 3d, hot air or hot nitrogen gas 33 of 200–300° C. is blown from the hot air gun 27 to the magnetic head slider 21 to heat this area up to a high temperature which however will not damage the suspension 20 so as to loosen the resin adhesive 28 to some extent. Then, as shown in FIG. 3e, the magnetic head slider 21 is detached from the suspension 20 and discarded.

Figure 3F:
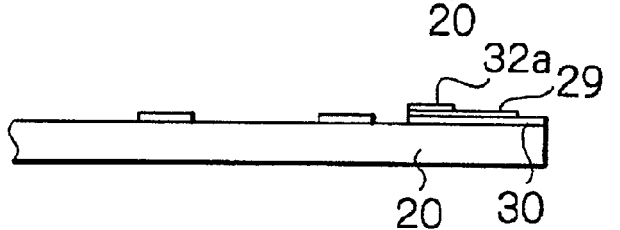

Thereafter, adhesive residue 28' remained on the suspension 20 is removed by dissolving it using solvent, by blowing hot air or hot nitrogen gas, or by mechanically dropping, and then the suspension surface is cleaned to obtain the suspension 20 shown in FIG. 3f.

Then, the suspension from which the defective magnetic head slider was removed is checked with respect to its load (load gram), its attitude angle (static pitch angle, static roll angle) and others so as to judge whether this suspension can be reused or not (step S6). If necessary, the load and the attitude angle may be appropriately adjusted. Then, a visual inspection for checking whether there is any damage in the appearance of the suspension or not is executed (step S7).

Based upon these inspections at steps S6 and S7, when it is judged that the suspension cannot be reused even if some adjustment is applied thereto, this suspension will be discarded (step S11).

The suspension passing through the inspections at steps S6 and S7 is reused in assembling an HGA (step S8). Namely, the HGA is assembled by fixing a new magnetic head slider with a thin-film magnetic head element to a top end section of this reusing suspension with an adhesive such as an epoxy resin adhesive, and then by electrically connecting terminal electrodes of the slider with connection pads of a lead conductor pattern of the suspension by GBB.

Then, a final inspection using a DP tester, for checking whether the thin-film magnetic head element of the new slider has a desired electrical property or not is executed (step S9). HGAs judged in this final inspection as products with a good performance are permitted for a shipment or assembling into an HDD (step S10).

In the final inspection at step S9, if it is judged that the electrical property of the thin-film magnetic head element is defective, the HGA will be discarded (step S11). In modifications, this HGA may not be discarded but may be tried to reuse the suspension again by executing the same process from step S3.

As aforementioned, since the relatively expensive wireless suspension is reused in manufacturing of the HGA, a manufacturing cost of the HGA can be reduced. Also, since the suspensions are reused without discarding all of them in the defective HGAs, this method can contribute to environmental protection.

The material of gold is soft. Thus, cutting of the gold ball using a sharp cutter blade is very easy to carry out. In this embodiment, the cutting of the GBB connection is executed to cut only the gold ball and to remain the thin gold layer on the connection pad of the suspension. Namely, the whole gold ball is not removed. Therefore, deformation of the suspension due to the cutting of the GBB connections can be almost prevented from occurring. Furthermore, since the thin gold layer is remained on the connection pad of the suspension, GBB of an electrode terminal of a magnetic head slider with the connection pad when remounting the slider on the suspension can become easy and a strength of the re-bonded section will increase.

Actually, many of HGAs using new suspensions and of HGAs using reused suspensions were fabricated, and fixing strength of the suspensions and magnetic head sliders, connection strength and connection reliability of the GBB connections such as reliability in connection against the ultra sonic cleaning and the thermal shock, load and attitude angle of the HGAs, flying performance and flying height of the HGAs and others were measured. However, no characteristics of the HGAs using reused suspensions was deteriorated to exceed a permissible extent from the characteristics of the HGAs using new suspensions. Rather, the connection strength at the GBB in the HGAs using reused suspensions was larger than that of the HGAs using new suspensions.

Figure 4:
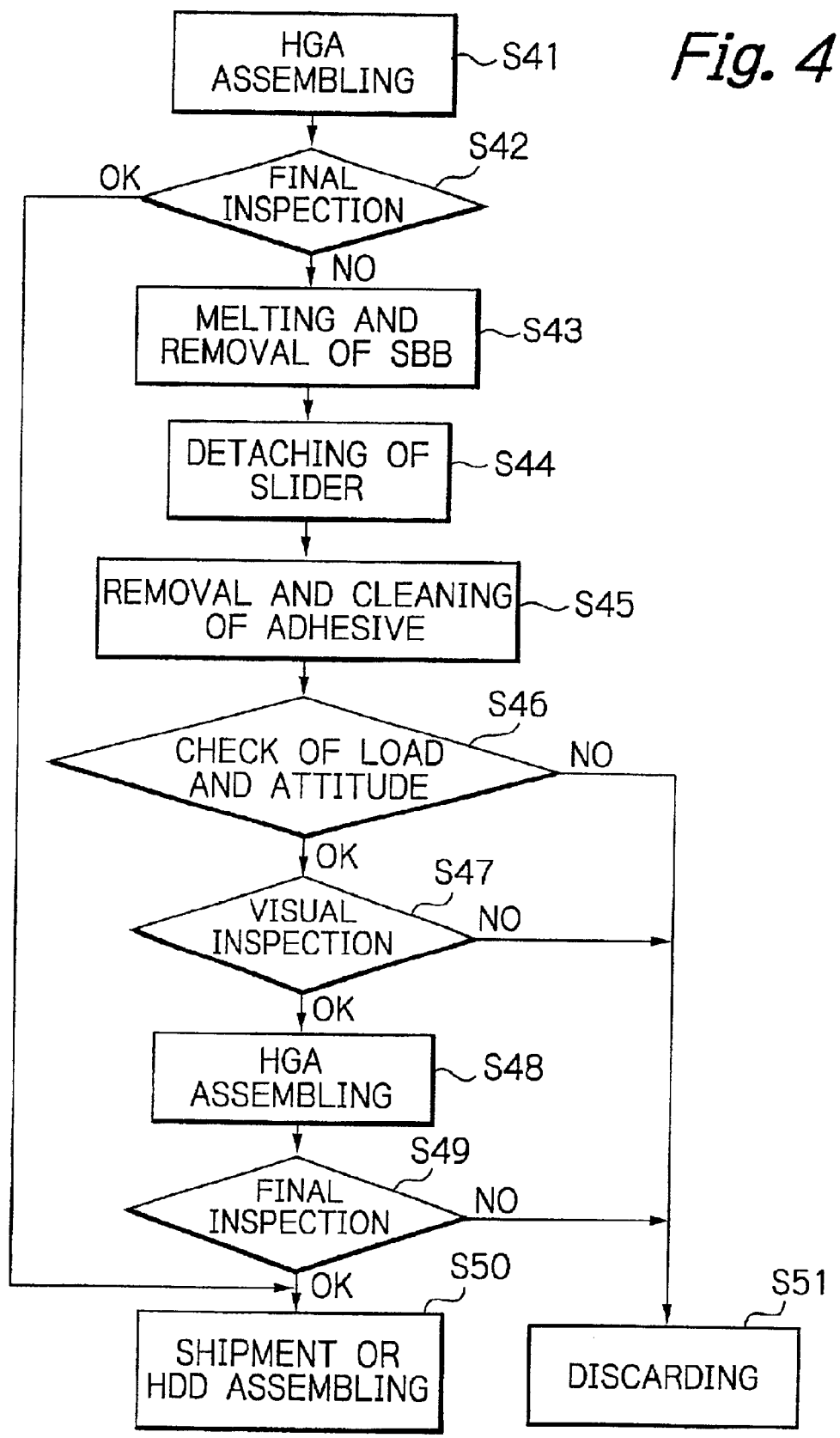
FIG. 4 shows a flow chart illustrating a part of manufacturing process of an HGA in another embodiment according to the present invention.

FIG. 4 illustrates a part of manufacturing process of an HGA in another embodiment according to the present invention, and FIGS. 5a to 5d illustrate processes from a removing by melting solder ball bonding (SBB) connections to a cleaning of suspension surface in this embodiment shown in FIG. 4.

First, an HGA is assembled in accordance with a normal fabrication process (step S41). Namely, the HGA is assembled by fixing a magnetic head slider with a thin-film magnetic head element to a top end section of a wireless suspension using an adhesive such as an epoxy resin adhesive, and then by electrically connecting terminal electrodes of the slider with connection pads of a lead conductor pattern by SBB. An IC chip with a head drive circuit and a read-out signal amplifier circuit may be mounted on the lead conductor pattern extending backward from the suspension.

Then, a final inspection using a DP tester, for checking whether the thin-film magnetic head element has a desired electrical property or not is executed (step S42). HGAs judged in this final inspection as products with a good performance are permitted for a shipment or assembling into an HDD (step S50).

In the final inspection at step S42, if it is judged that the electrical property of the thin-film magnetic head element is defective, the SBB connections are heated to melt and to remove the solder balls (step S43). Then, the adhesive is loosened to some extent by heating and the slider is detached from the suspension (step S44). The detached slider will be discarded. Thereafter, the remaining adhesive is removed and an adhesion surface of the suspension to which the slider had been adhered is cleaned (step S45).

Hereinafter, the above-mentioned processes from the solder ball removing process to the cleaning process will be described in detail.

Figure 5A:
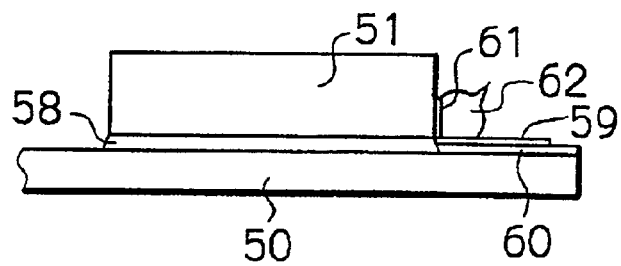
FIGS. 5a to 5d illustrate processes from a removing by melting SBB connections to a cleaning of suspension surface in the embodiment shown in FIG. 4.

In FIG. 5a which illustrates the magnetic head slider and a part of the suspension before separating, reference numeral 58 denotes a resin adhesive for adhering the magnetic head slider 51 to the suspension 50, 59 the connection pad formed as a part of the lead conductor pattern 60 laminated on the suspension 50, 61 the terminal electrode of the magnetic head slider 51, and 62 the solder ball used for electrically connecting the terminal electrode 61 with the connection pad 59, respectively. The resin adhesive 58 may be for example a thermosetting resin adhesive with a glass transition point of 150° C. such as an epoxy resin adhesive or an acryl UV resin adhesive.

Figure 5B:
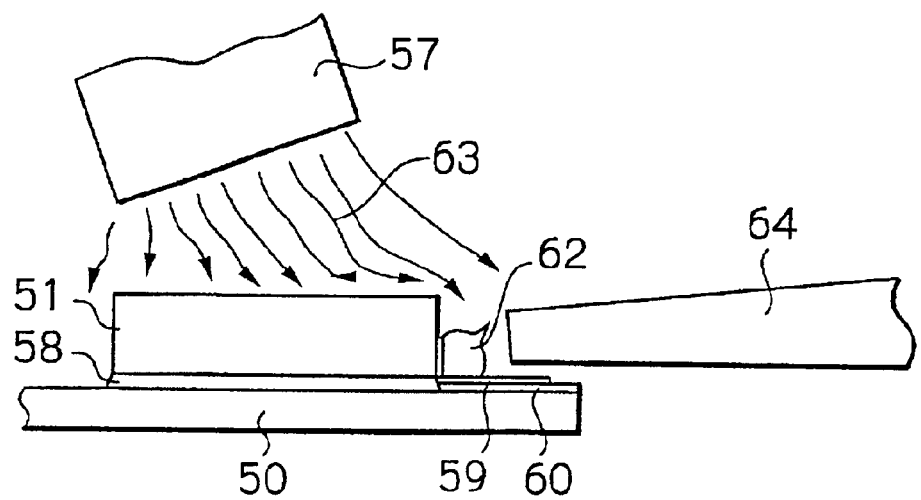

As shown in FIG. 5b, hot air or hot nitrogen gas 63 of 200–300° C. is blown from the hot air gun 57 to the magnetic head slider 51 and the SBB connection to heat this area up to a high temperature which however will not damage the suspension 50 so as to melt the solder ball 62. The molten solder is removed by suction of a vacuum nozzle 64.

Figure 5C:
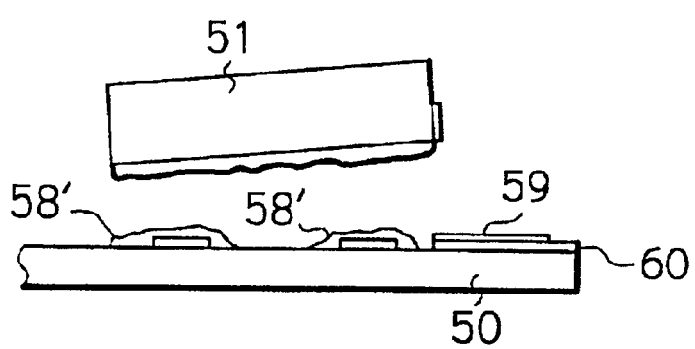

Also, this heating loosens the resin adhesive 58 to some extent. Then, as shown in FIG. 5c, the magnetic head slider 51 is detached from the suspension 50 and discarded.

Figure 5D:
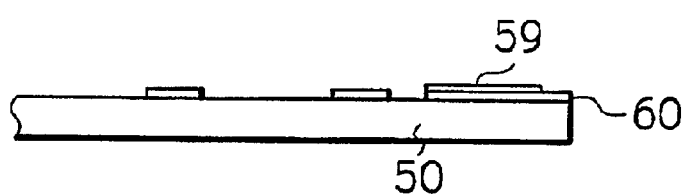

Thereafter, adhesive residue 58' remained on the suspension 50 is removed by dissolving it using solvent, by blowing hot air or hot nitrogen gas, or by mechanically dropping, and then the suspension surface is cleaned to obtain the suspension 50 shown in FIG. 5*d*.

Then, the suspension from which the magnetic head slider was detached is checked with respect to its load (load gram), its attitude angle (static pitch angle, static roll angle) and others so as to judge whether this suspension can be reused or not (step S46). If necessary, the load and the attitude angle may be appropriately adjusted. Then, a visual inspection for checking whether there is any damage in the appearance of the suspension or not is executed (step S47).

Based upon these inspections at steps S46 and S47, when it is judged that the suspension cannot be reused even if some adjustment is applied thereto, this suspension will be discarded (step S51).

The suspension passing through the inspections at steps S46 and S47 will be used in assembling an HGA (step S48). Namely, the HGA is assembled by fixing a new magnetic head slider with a thin-film magnetic head element to a top end section of this reusing suspension with an adhesive such as an epoxy resin adhesive, and then by electrically connecting terminal electrodes of the slider with connection pads of a lead conductor pattern of the suspension by SBB.

Then, a final inspection using a DP tester, for checking whether the thin-film magnetic head element of the new slider has a desired electrical property or not is executed (step S49). HGAs judged in this final inspection as products with a good performance are permitted for a shipment or assembling into an HDD (step S50).

In the final inspection at step S49, if it is judged that the electrical property of the thin-film magnetic head element is defective, the HGA will be discarded (step S51). In modifications, this HGA may not be discarded but may be tried to reuse the suspension again by executing the same process from step S43.

As aforementioned, since the relatively expensive wireless suspension is reused in manufacturing of the HGA, a manufacturing cost of the HGA can be reduced. Also, since the suspensions are reused without discarding all of them in the defective HGAs, this method can contribute to environmental protection.

Many widely different embodiments of the present invention may be constructed without departing from the spirit and scope of the present invention. It should be understood that the present invention is not limited to the specific embodiments described in the specification, except as defined in the appended claims.

What is claimed is:

1. A manufacturing method of a head gimbal assembly comprising the steps of:

mounting a magnetic head slider with at least one thin-film magnetic head element on a wireless suspension, said mounting including a) using a resin adhesive to fix the magnetic head slider to the wireless suspension and b) electrically connecting said magnetic head slider with said suspension with ball bonding connections;

inspecting electrical property of said at least one thin film magnetic head element;

separating said ball bonding connections when determined that said at least one thin-film magnetic head element has defective electrical property;

detaching said magnetic head slider from said suspension by heating a part of said magnetic head slider and a part of said suspension to loosen the resin adhesive used to fix said magnetic head slider to said suspension; and mounting a new magnetic head slider with at least one thin-film magnetic head element on said suspension from which said magnetic head slider was detached.

2. The manufacturing method as claimed in claim 1, wherein said ball bonding connections are gold ball bonding connections using gold balls.

3. The manufacturing method as claimed in claim 2, wherein said separating step comprises cutting said gold balls by a cutter blade.

4. The manufacturing method as claimed in claim 3, wherein said cutting of the gold balls comprises cutting said gold balls so that a thin gold layer remains on connection pads formed on said suspension.

5. The manufacturing method as claimed in claim 1, wherein said ball bonding connections are solder ball bonding connections using solder balls.

6. The manufacturing method as claimed in claim 5, wherein said separating step comprises heating and melting said solder balls.

7. The manufacturing method as claimed in claim 6, wherein said separating step further comprises removing the molten solder ball by vacuum suction.

8. The manufacturing method as claimed in claim 1, wherein said method further comprises a step of cleaning an adhesion surface of said suspension after said detaching step.

9. The manufacturing method as claimed in claim 1, wherein said method further comprises a step of checking performance of said suspension after said detaching step.

10. The manufacturing method as claimed in claim 9, wherein said checking step comprises checking a load and an attitude angle of said suspension.

11. The manufacturing method as claimed in claim 1, wherein said method further comprises a step of inspecting electrical property of said at least one thin-film magnetic head element of said new magnetic head slider after said new magnetic head mounting step.

* * * * *